United States Patent [19]

Chancey

[11] Patent Number: 5,471,939
[45] Date of Patent: Dec. 5, 1995

[54] HANDHELD MECHANICAL DEVICE TO PLANT SEED

[75] Inventor: Kenneth J. Chancey, Patterson, Ga.

[73] Assignee: Lingh A. Chancey, Patterson, Ga.

[21] Appl. No.: 104,905

[22] Filed: Aug. 12, 1993

[51] Int. Cl.$^6$ ........................................ A01C 5/02
[52] U.S. Cl. .................... 111/107; 111/92; 111/95
[58] Field of Search ........................ 111/106, 107, 111/115, 92, 94, 95, 96, 97, 50, 7.1; 222/175, 505, 517, 608

[56] References Cited

U.S. PATENT DOCUMENTS

| 625,774 | 5/1899 | Kerr | 111/92 |
| 788,717 | 5/1905 | Hart | 111/95 |
| 909,289 | 1/1909 | Grisell | 111/92 |
| 2,656,071 | 10/1953 | Smith . | |
| 2,860,536 | 11/1953 | Nozell | 111/92 |
| 2,865,315 | 12/1958 | Goldstein | 111/92 |
| 3,150,620 | 9/1964 | Popplewell | 111/95 |
| 3,749,034 | 7/1973 | Gergius et al. | 111/92 |
| 4,706,582 | 11/1987 | Keskilohko . | |

FOREIGN PATENT DOCUMENTS

| 147576 | 8/1950 | Australia | 111/95 |
| 15237 | 1/1903 | Sweden | 111/95 |

*Primary Examiner*—Randolph A. Reese
*Assistant Examiner*—Spencer Warnick

[57] ABSTRACT

A seed planter having a seed drop tube entrance opening (Bracket 10), connected to a seed drop tube (Bracket 12) with a planter assembly (Bracket 14) leading to seed release bracket and lever assembly (Bracket 16), attached to a flexible wire cable (Bracket 18) and bracket with cable pulley assembly (Bracket 20), utilizing compression springs with stud assembly (Bracket 22) and a hinged soil penetrator and seed release gate assembly (Bracket 24).

6 Claims, 2 Drawing Sheets

5,471,939

HANDHELD MECHANICAL DEVICE TO PLANT SEED

BACKGROUND

1. Field of Invention

This invention is a handheld seed planter.

2. Description of Prior Art

Garden and farm supply stores presently have no similar hand-held garden tool which allows the individual gardener to place seeds precisely into the soil from an upright, ambulatory stance. Current methods for hand planting of seeds are performed by using an instrument with a wooden or metal handle of some length attached to a sharp object. Such a tool is typically referred to as a hoe. One might also kneel on the ground using a spade or trowel to ensure proper number and placement of seeds.

OBJECTS AND ADVANTAGES

The apparent objects and advantages of the Handheld Mechanical Operated Device for Planting Seeds are contained only by the creativity of the gardener in the choice of soil preparation and variety of seeds used. This planter will enable the user to stand erect and place seeds of various sizes in precise seedbeds. Particular advantage is given by this instrument to the elderly and physically disadvantaged, by allowing the user to stand erect during seed placement. Use of the seed planter further assists in rapid seed distribution. Additionally, proper and precise placement into the seed bed is assured even under a variety of adverse weather and soil conditions.

DRAWING FIGURES

In the drawings, closely related figures have the same number.

DISCLOSURE

Figure 1:
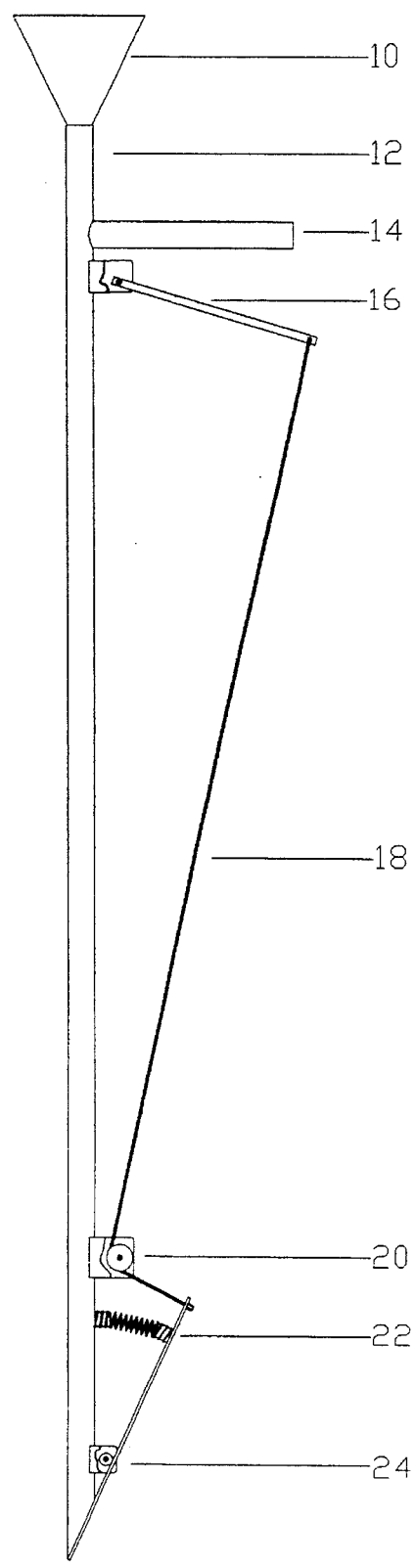
FIG. 1 is the seed planter shown in closed view in preparation of planting seed.

Reference Numerals in Drawings FIG. 1: SIDE VIEW OF PLANTER IN CLOSED POSITION

Figure 2:
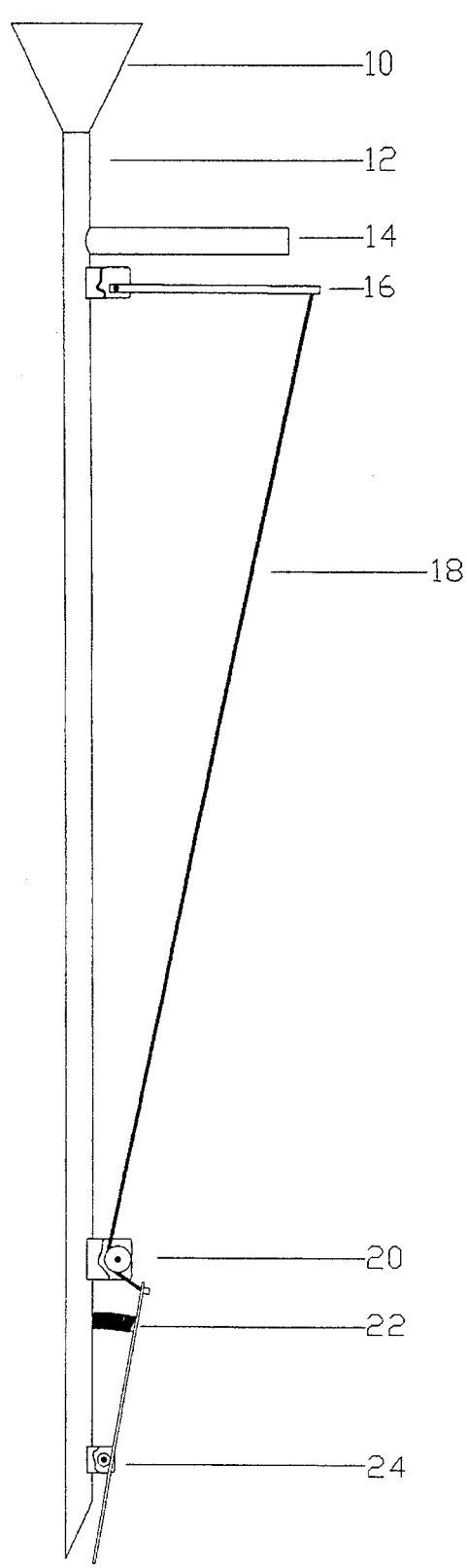
FIG. 2 is the seed planter shown in open position having deposited seed into soil.
Figure 3:
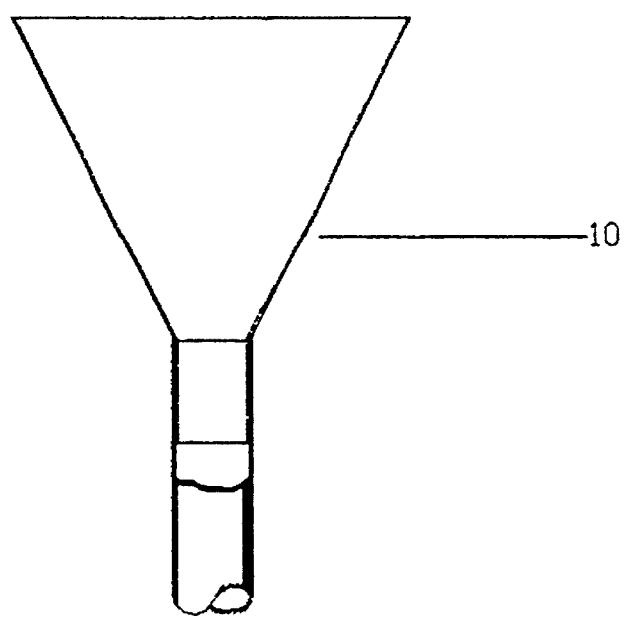
FIG. 3 is the seed drop tube entrance opening.
Figure 4:
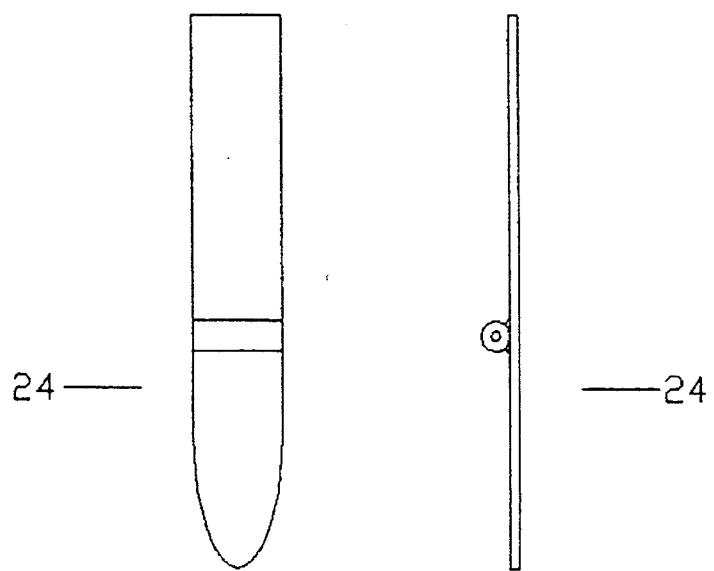
FIG. 4 is the soil penetrator and seed release gate assembly.

SEED DROP TUBE ENTRANCE OPENING (BRACKET 10)
SEED DROP TUBE (BRACKET 12)
PLANTER HANDLE ASSEMBLY (BRACKET 14)
SEED RELEASE BRACKET AND LEVEL ASSEMBLY (BRACKET 16)
FLEXIBLE WIRE CABLE (BRACKET 18)
BRACKET WITH CABLE PULLEY ASSEMBLY (BRACKET 20)
COMPRESSION SPRINGS WITH STUD ASSEMBLY (BRACKET 22)
HINGED SOIL PENETRATOR AND SEED RELEASE GATE ASSEMBLY (BRACKET 24)
FIG. 2: SIDE VIEW OF PLANTER IN OPEN POSITION
SEED DROP TUBE ENTRANCE OPENING (BRACKET 10)
SEED DROP TUBE (BRACKET 12)
PLANTER HANDLE ASSEMBLY (BRACKET 14)
SEED RELEASE BRACKET AND LEVER ASSEMBLY (BRACKET 16)
FLEXIBLE WIRE CABLE (BRACKET 18)
BRACKET WITH CABLE PULLEY ASSEMBLY (BRACKET 20)
COMPRESSION SPRING WITH STUD ASSEMBLY (BRACKET 22)
HINGED SOIL PENETRATOR AND SEED RELEASE GATE ASSEMBLY (BRACKET 24)
FIG. 3: SEED DROP TUBE ENTRANCE OPENING
SEED DROP TUBE ENTRANCE OPENING (BRACKET 10)
FIG. 4: HINGED SOIL PENETRATOR AND SEED RELEASE GATE ASSEMBLY SHOWING FRONTAL AND SIDE VIEWS (BRACKET 24)

DESCRIPTION—FIGS. 1 to 4

The pipe illustrated in FIG. 1 is an elongated tubular member comprised of galvanized pipe, having a first end and a second end.

The present invention is illustrated in FIG. 1 in a side view with the hinged soil penetrator and seed release gate assembly closed. The funnel-like opening is a lightweight plastic or metal material (Bracket 10). A seed drop tube attaches to the opening and a drop tube wall (Bracket 12). Beneath the handle is a seed release lever assembly composed of a tube and a u-shaped bracket (Bracket 16). Seed release lever is attached to a bracket by a diagonal pin through a hole in the bracket and a hole in the seed release lever.

The seed release lever assembly is attached by a flexible wire cable (Bracket 18). An additional bracket assembly consisting of 2 like pieces, fully attached between bracket pieces by a pin through holes in the bracket and pulley (Bracket 20). A compression spring with stud assembly is a coiled spring with 2 spring retaining studs, one for attachment to soil penetrator bracket assembly and one for attachment to drop tube (Bracket 22).

Finally comes the soil penetrator bracket assembly tube attached to the soil penetrator to the bracket on the drop tube with pins used to penetrate soil in seed bed (Bracket 24).

BEST MODE TO CARRY OUT INVENTION

It is easy for the reader to understand the obvious advantages of such a simple, easy to use handheld seed planter. The user will be able to stand erect and plant at an easy pace, as opposed to stooping and/or kneeling on the seed bed for planting. Particular advantage is given by the precise placement of seeds into seed bed under a variety of adverse weather and soil conditions. The Handheld Mechanical Operated Device for Planting Seeds was developed for general use by gardeners, but not limited to garden seeding use alone. The unit is made of lightweight, durable material, simple in operation and economical to purchase.

Thus, the scope of the invention should be determined by the appended claims and their legal equivalents, rather than by the examples given.

I claim:

1. A handheld seed planter comprising:

an elongated tubular member having a first end and a second end; a soil penetrating door member pivotally mounted to said second end of said tubular member; a lever assembly pivotally mounted said first end of said tubular member; a flexible wire cable connected to said lever assembly and connected to said door member; a bracket adjacent to said second end and having a wire support member which the wire cable is located around, wherein pivoting of the lever assembly moves the wire cable about said wire support member to pivot the door member between an open and closed position with respect to the second end of the tubular member.

2. The handheld seed planter of claim 1, wherein the tubular member has a frusto-conical guide member located atop said first end to direct seed into said first end.

3. The handheld seed planter of claim 1, wherein the elongated tubular member is made of galvanized pipe.

4. The handheld seed planter of claim 1, wherein a handle is connected to said first end of said tubular member.

5. The handheld seed planter of claim 1, wherein the wire support member is a pulley which the wire cable rotates around when moved by the lever assembly.

6. The handheld seed planter of claim 1, wherein a spring is provided between the door member and the tubular member to bias the door member to said closed position.

* * * * *